United States Patent
Lamb

(10) Patent No.: US 10,057,214 B2
(45) Date of Patent: Aug. 21, 2018

(54) DNSSEC LIGHTWEIGHT DATABASE ACCESS PROTOCOL GATEWAY

(71) Applicant: Richard Lamb, Petaluma, CA (US)

(72) Inventor: Richard Lamb, Petaluma, CA (US)

(*) Notice: Subject to any disclaimer, the term of this patent is extended or adjusted under 35 U.S.C. 154(b) by 270 days.

(21) Appl. No.: 15/206,254

(22) Filed: Jul. 9, 2016

(65) Prior Publication Data

US 2018/0013726 A1 Jan. 11, 2018

(51) Int. Cl.
*H04L 29/06* (2006.01)
*H04L 29/12* (2006.01)
*H04L 12/24* (2006.01)

(52) U.S. Cl.
CPC .......... *H04L 63/0281* (2013.01); *H04L 41/28* (2013.01); *H04L 61/1511* (2013.01); *H04L 61/1523* (2013.01); *H04L 63/126* (2013.01); *H04L 63/166* (2013.01)

(58) Field of Classification Search
None
See application file for complete search history.

(56) References Cited

U.S. PATENT DOCUMENTS

| | | | | |
|---|---|---|---|---|
| 5,855,020 A * | 12/1998 | Kirsch | .............. | G06F 17/30864 |
| 5,907,680 A * | 5/1999 | Nielsen | ............. | G06F 17/30887 |
| | | | | 707/E17.115 |
| 6,041,041 A * | 3/2000 | Ramanathan | ....... | H04L 41/0213 |
| | | | | 370/241 |
| 6,041,324 A * | 3/2000 | Earl | .................. | G06F 17/30887 |
| 6,092,178 A * | 7/2000 | Jindal | ............... | H04L 29/12009 |
| | | | | 712/27 |
| 6,332,158 B1 * | 12/2001 | Risley | ............... | G06F 17/30887 |
| | | | | 707/E17.115 |
| 9,967,290 B2 * | 5/2018 | Osterweil | .............. | H04L 63/20 |
| 2003/0191757 A1 * | 10/2003 | Ambrosini | ........ | G06F 17/30589 |
| 2004/0193725 A1 * | 9/2004 | Costa-Requena | . | H04L 29/12094 |
| | | | | 709/238 |
| 2005/0182781 A1 * | 8/2005 | Bouvet | ............. | H04L 29/12066 |
| 2008/0118070 A1 * | 5/2008 | Yeap | ................... | H04L 63/0823 |
| | | | | 380/282 |
| 2008/0313699 A1 * | 12/2008 | Starostin | ................. | H04L 63/10 |
| | | | | 726/1 |
| 2009/0198997 A1 * | 8/2009 | Yeap | ................... | H04L 63/0823 |
| | | | | 713/155 |
| 2017/0272467 A1 * | 9/2017 | Osterweil | .............. | H04L 63/20 |

OTHER PUBLICATIONS

STIC Search Strategies (Year: 2018).*

* cited by examiner

*Primary Examiner* — Sharon S Lynch
*Assistant Examiner* — F J Farhadian

(57) ABSTRACT

A system that converts standardized lightweight database access protocol (LDAP) requests into a series of domain name system (DNS) requests to look up requested information. DNS responses are validated using DNS security extensions (DNSSEC) to ensure their validity, then converted into standardized LDAP responses. The system is either operated as a service for public use on the Internet or private use in an enterprise; or as an application running on end user machines, e.g., laptops, mobile phones, to guarantee end-to-end security by validating responses on the end user machine. The standardized, widespread nature of the LDAP allows existing applications to immediately reap the benefits of global, ubiquitous, cross-organizational, transnational data distribution via DNS secured by DNSSEC.

5 Claims, 1 Drawing Sheet

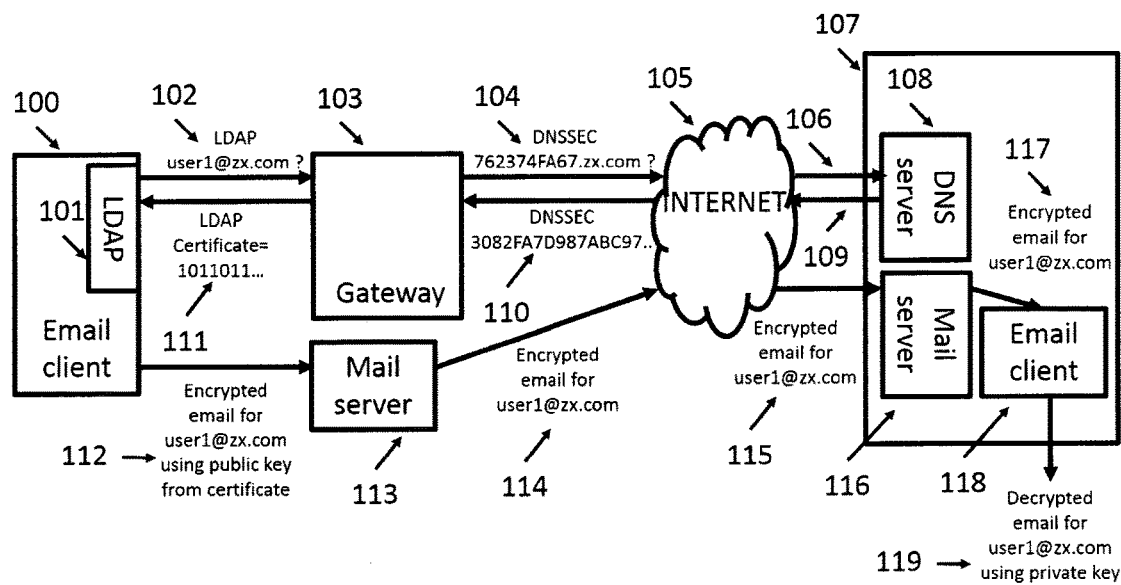

DNSSEC LIGHTWEIGHT DATABASE ACCESS PROTOCOL GATEWAY

NOTE

The present applications claims priority to the earlier filed provisional application having Ser. No. 62/183,323, and hereby incorporates subject matter of the provisional application in its entirety.

TECHNICAL FIELD

The present invention relates to the secure cross-organizational, trans-national distribution of information based on a nascent protocol referred to as Domain Name System Security Extensions (DNSSEC). More particularly, the present invention relates to a system which directly translates between an existing widespread Internet database protocol referred to as the lightweight database access protocol (LDAP) and DNSSEC. By doing so, the present invention instantly brings the benefits of DNSSEC to Internet users at large. Examples include simplified and widespread dissemination of key material used for encrypted email communication.

DESCRIPTION OF INVENTION

The borderless and international nature of the Internet has challenged many of the existing secure national, regional, and organizational information distribution mechanisms. Lack of common systems is often to blame in addition to organizational management boundaries. However, with respect to the Internet, the domain name system (DNS) has been and continues to be, along with Internet routing protocols, a ubiquitous and common database system used by all—currently for looking up names. Recognizing its ubiquity, the DNS has been used for other look up applications as well, most notably email. Originally, given the inherent trust in its early users, the Internet was not designed to be secure and therefore its applicability to wider use as a distribution (or bootstrap) mechanism has been or should have been limited. Due to the need to secure DNS in today's broader Internet ecosystem a protocol called DNS security extensions or DNSSEC was developed and is enjoying brisk deployment on the Internet's infrastructure. However, as with any change to a 25+ year old system, adoption at the edges has been slow.

The purpose of the present invention is to accelerate bringing the benefits of DNSSEC to a broader Internet user base as well as accelerate adoption. To do this it builds on the existing widespread reliance of applications on the lightweight database access protocol (LDAP) and translates between LDAP and DNSSEC, on-the-fly. Since these are two very different protocols with different purposes, the translation requires discerning the purpose of the LDAP requests, the semantics of protocols, administration, formats, and cryptography. This is very much unlike the typical, reversed, approach of using DNSSEC as an interface to existing static LDAP databases.

LDAP typically deals with a relatively static database with record updates occurring via one channel and LDAP requests happening via another. Hence the database typically must first be populated with records before a record can be looked up. The present invention substitutes the back-end database with the global DNS itself along with a system and software to translate the semantics, format, and protocol of LDAP to DNS and validation via DNSSEC as well as current and upcoming standards for storing new information in the DNS such as DANE[1], SMIMEA[2], SSHFP[3]. Since translation happens on demand, the invention requires no storage, relying instead on the DNS and caching at the DNS resolver to speed up lookups for duplicate information. With the present invention the benefits of secured data distribution via DNSSEC can be realized seamlessly in existing systems relying on LDAP.

BRIEF DESCRIPTION OF DRAWINGS

FIG. 1 shows a diagram of a preferred embodiment of the present invention as part of an overall system.

PREFERRED EMBODIMENT

The preferred embodiment of the present invention consists of an email client (100) with built in support for LDAP (101) such as Microsoft Outlook. When the user enters an email address such as user1@zx.com, the email client asks preconfigured LDAP servers for further information on this email address which may include full name and cryptographic key information. The latter is what is necessary to encrypt email exchanges. The query (102) is typically made of existing corporate directories containing employee and specific client information. For a non-corporate email client as depicted on the left had side of FIG. 1, there is typically no such centralized, shared directory. In this case, the query (102) can be made of a public directory service or a virtual one implemented on the email client machine itself. If a public directory service is used, requests and responses traverse the Internet.

The preferred embodiment of the present invention spoofs the directory service (103), regardless of its location, by processing LDAP requests (102) and returning LDAP responses (111). It converts LDAP requests (102) into a series of DNSSEC requests (104) and converts corresponding DNSSEC responses (110) into LDAP responses (111) on the fly. The DNSSEC requests and responses travel over the Internet (105) and may involve multiple intermediate DNS servers and DNS resolution servers to eventual query (106) the authoritative DNS server responsible for the domain on the right hand side of the email address, in this case zx.com (108). This DNS server responds (109) either directly or via an intermediate DNS resolving server with the requested information to the directory server/gateway (103). The gateway ensures the response (110) has not been surreptitiously modified by using DNSSEC to validate the response. Once validated the gateway assembles and converts the format of these responses into a LDAP response (111) for the LDAP client (101) to provide the requested information to the email client (100).

Now armed with information associated with email address such as cryptographic keys, the user of the email client (100) can send encrypted email (112) to users using a corporate (107) email client (118), without having to first exchange keys between them or relying on a trusted third party authority and associated fees and management overhead. In the preferred embodiment, the gateway (103) would use its own key to vouch for the authenticity of email keys it has discovered and validated using DNSSEC. This single key would be used by the email client (100) to establish trust in the keys received via LDAP so that they may be used to encrypt transmission for remote addresses. The remote email client (118) is preconfigured to trust its own keys by virtue of being the source of those keys. Encryption protects the email from modification or viewing as it traverses the typical email path through mail servers (113,116), Internet (105) and corporate infrastructure (107).

The preferred embodiment should not be considered to exclude the wider claims of the present invention which include the translation of ANY current or future information made available in the DNS (protected by DNSSEC) into suitable LDAP requests and responses. The current set of standards in the IETF relying on DNSSEC as a secure transmission mechanism [1,2,3,4] are an indication of this growing list.

REFERENCES

[1] DNS-Based Authentication of Named Entities/DANE https://tools.ietf.org/html/rfc6698
[2] Using Secure DNS to Associate Certificates with Domain Names For S/MIME https://tools.ietf.org/html/draft-ietf-dane-smime-08
[3] Using DNS to Securely Publish Secure Shell (SSH) Key Fingerprints https://tools.ietf.org/html/rfc4255
[4] TLS sessions in SIP using DNS-based Authentication of Named Entities (DANE) TLSA records https://tools.ietf.org/html/draft-johansson-dispatch-dane-sip-01

What is claimed:

1. A method for translating between standardized lightweight database access protocol (LDAP) requests and domain name system (DNS) security extensions (DNSSEC) secured requests, the method comprising:
   a gateway service for receiving standardized LDAP requests submitted by a first email client, running on a first computing device, the first email client submitting a standardized LDAP request to a DNS resolving server, wherein the first computing device is connected to a corporate infrastructure computing environment over a first public internet connection;
   in response to receiving the standardized LDAP request from the first email client, the gateway service converting the standardized LDAP request into a series of DNSSEC requests such that the series of DNSSEC requests are configured to ascertain same information sought in the standardized LDAP request from the DNS resolving server, said information comprising at least a public key;
   the gateway service transmitting the series of DNSSEC requests to the DNS resolving server for processing, the gateway service running on the first computing device to guarantee security by validating DNS responses received when submitted to the DNS resolving server in real-time;
   in response to receiving a DNS response to the series of DNSSEC requests from the DNS resolving server, the gateway service validating the DNS responses using DNSSEC protocol;
   the gateway service discarding an invalid DNSSEC response and returning a LDAP error to the first email client submitting the standardized LDAP request; and
   the gateway service converting a validated DNSSEC response into a LDAP response including the public key and returning the validated DNSSEC response to the first email client submitting the standardized LDAP request,
   wherein the first email client utilizes the public key to encrypt email content transmitted from the first email client, over a second public internet connection, to a second email client running on the corporate infrastructure computing environment, wherein the second email client uses a private key paired with the public key to decrypt the email content transmitted from the first email client, and
   wherein the first internet connection is at least in part different from the second public internet connection such that requests transmitted between the first email client and the DNS resolving server are routed through the gateway service and the first public internet connection and the email content transmitted between the first email client and the second email client is routed through an email server and the second public internet connection, the email server being external to the first computing device.

2. The method of claim 1, further comprising the gateway service servicing LDAP requests submitted by the email client in real-time.

3. The method of claim 2, further comprising the gateway service supporting secure LDAP communications.

4. The method of claim 3, further comprising the gateway service using a public-private key pair to digitally sign information obtained from the DNS resolving server before converting DNSSEC responses to LDAP responses, where the first email client uses a public key of the public-private key pair to verify information in the LDAP responses.

5. The method of claim 1, where the gateway service is operated as a public or enterprise wide gateway where an operator of the gateway service and connection to the operator is trusted.

* * * * *